US012785317B2

(12) United States Patent
Yokota

(10) Patent No.: US 12,785,317 B2
(45) Date of Patent: Nov. 3, 2026

(54) CONNECTOR

(71) Applicant: SUMITOMO WIRING SYSTEMS, LTD., Mie (JP)

(72) Inventor: Tomohiro Yokota, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 339 days.

(21) Appl. No.: 18/662,700

(22) Filed: May 13, 2024

(65) Prior Publication Data

US 2024/0396254 A1 Nov. 28, 2024

(30) Foreign Application Priority Data

May 23, 2023 (JP) ................................ 2023-084690

(51) Int. Cl.
*H01R 13/50* (2006.01)
*H01R 13/502* (2006.01)
*H01R 24/40* (2011.01)

(52) U.S. Cl.
CPC ........... *H01R 13/502* (2013.01); *H01R 24/40* (2013.01)

(58) Field of Classification Search
CPC .............................. H01R 13/502; H01R 24/40
See application file for complete search history.

(56) References Cited

U.S. PATENT DOCUMENTS 8,403,705 B2 * 3/2013 Liu .................... H01R 13/6658 439/607.58
9,437,957 B2 * 9/2016 Lee .................... H01R 13/5202
2019/0109420 A1 4/2019 Hasenöhrl
2020/0227873 A1 7/2020 Hasenöhrl et al.
2021/0344147 A1 11/2021 Hasenöhrl et al.
2023/0030972 A1 2/2023 Yamada

FOREIGN PATENT DOCUMENTS

JP 3233846 U 9/2021

* cited by examiner

*Primary Examiner* — Phuong K Dinh
(74) *Attorney, Agent, or Firm* — Venjuris, P.C.

(57) ABSTRACT

A connector includes an electrically conductive outer conductor 12 surrounding an inner conductor 11 via an insulating inductor 13, and an electrically insulating housing 14 to be coupled to the outer conductor 12. The outer conductor 12 includes a hooking portion 35 at a front end portion thereof, and the housing 14 includes a hooked portion 57 at a rear end portion thereof. A rear surface of the hooking portion 35 opposes a front surface of the hooked portion 57. The rear surface of the hooking portion 35 includes a rib-shaped contact portion 36 that can come into contact with the front surface of the hooked portion 57.

6 Claims, 14 Drawing Sheets

CONNECTOR

CROSS-REFERENCE TO RELATED APPLICATIONS

This application is based on and claims priority from Japanese Patent Application No. 2023-084690, filed on May 23, 2023, with the Japan Patent Office, the disclosure of which is incorporated herein in its entirety by reference.

TECHNICAL FIELD

The present disclosure relates to a connector.

BACKGROUND

A connector disclosed in JP 2019-071272 A includes a coding housing and a plug body coupled to the coding housing. A compatible connector is fitted to the coding housing from the front. The coding housing and the plug body each include a guide rail that extends in an up-down direction. The coding housing moves along the two guide rails from above, and is press-fitted and attached to the plug body. The plug body is an outer conductor that surrounds an inner conductor portion via a contact body. Connectors including such an outer conductor are also disclosed in JP 2023-021590 A and JP 3233846 U.

SUMMARY

In JP 2019-071272 A, for example, if the guide rail of the coding housing and the guide rail of the plug body are press-fitted to each other in close contact, work for attaching the coding housing to the plug body may not be favorably performed. On the other hand, if a gap is formed between the guide rails, the coding housing may rattle with respect to the plug body. For this reason, with the configuration of JP 2019-071272 A, the positional relationship of the guide rails needs to be strictly set, and thus there is a problem in that the attachment work is significantly difficult.

In view of this, the present disclosure aims to provide a connector according to which an outer conductor and a housing can be easily attached to each other.

A connector according to the present disclosure is a connector including an electrically conductive inner conductor, an electrically conductive outer conductor surrounding the inner conductor via an electrically insulating inductor between the inner conductor and the outer conductor, and an electrically insulating housing configured to be coupled to the outer conductor, and the outer conductor includes a hooking portion at a front end portion thereof, the housing includes a hooked portion at a rear end portion thereof, a rear surface of the hooking portion opposes a front surface of the hooked portion, and a first surface out of the rear surface of the hooking portion and the front surface of the hooked portion includes a rib-shaped contact portion configured to come into contact with a second surface out of the rear surface of the hooking portion and the front surface of the hooked portion.

According to the present disclosure, it is possible to provide a connector according to which an outer conductor and a housing can be easily attached to each other.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
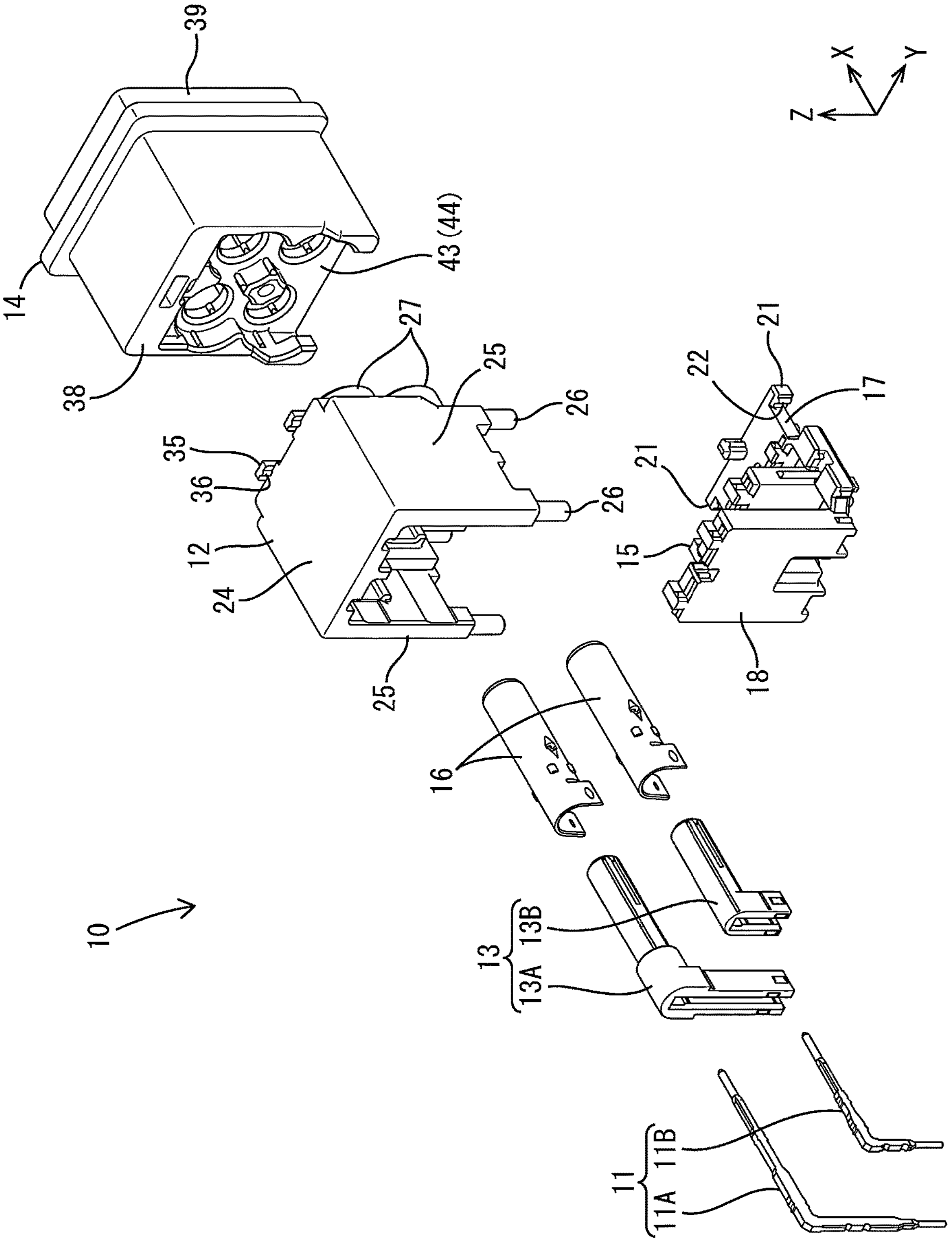
FIG. 1 is an exploded perspective view of a connector according to a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiment of the Present Disclosure

First, embodiments of the present disclosure will be listed and described.

(1) A connector according to the present disclosure includes an electrically conductive inner conductor, an electrically conductive outer conductor surrounding the inner conductor via an electrically insulating inductor between the inner conductor and the outer conductor, and an electrically insulating housing configured to be coupled to the outer conductor, and the outer conductor includes a hooking portion at a front end portion thereof, the housing includes a hooked portion at a rear end portion thereof, a rear surface of the hooking portion opposes a front surface of the hooked portion, and a first surface out of the rear surface of the hooking portion and the front surface of the hooked portion includes a rib-shaped contact portion configured to come into contact with a second surface out of the rear surface of the hooking portion and the front surface of the hooked portion.

Due to the rear surface of the hooking portion and the front surface of the hooked portion opposing each other, and the rib-shaped contact portion of either the hooking portion or the hooked portion coming into contact with the other one, the outer conductor and the housing can be attached to each other while avoiding the formation of a gap between the rear surface of the hooking portion and the front surface of the hooked portion.

(2) In the connector described in the above-described (1), it is preferable that the first surface is the rear surface of the hooking portion, and the second surface is the front surface of the hooked portion.

The outer conductor having the hooking portion is electrically conductive and formed by a metal rigid body, for example. The housing having the hooked portion is electrically insulating and formed by a molded body made of a synthetic resin, for example. When the contact portion of the metal hooking portion comes into contact with the front surface of the synthetic resin hooked portion, the hooked portion can be elastically deformed, or the contact portion can bite into the front surface of the hooked portion. Accordingly, with the configuration of the above-described (2), the amount that the contact portion protrudes from the rear surface of the hooking portion can be adjusted, making it possible to attach the outer conductor and the housing to each other with an appropriate holding force.

(3) In the connector described in the above-described (2), it is preferable that the outer conductor includes a first surface facing a first direction intersecting a front-rear direction, the housing includes a second surface facing a second direction that is opposite to the first direction, the hooking portion protrudes in the first direction beyond the first surface, the hooked portion protrudes in the second direction beyond the second surface, and the contact portion extends in the first direction beyond the first surface in the rear surface of the hooking portion.

In the configuration of the above-described (3), the outer conductor can be moved in the first direction and attached to the housing. The hooking portion protrudes from the first surface and need not be elongated like the guide rails in JP 2019-071272 A, and the slide structure of the hooking portion may be reduced in size or eliminated. In the configuration of the above-described (3), when the outer conductor and the housing are attached to each other, the case where contact resistance between the outer conductor and the housing becomes excessively large can be easily avoided.

(4) In the connector described in the above-described (3), it is preferable that a cross-section of the contact portion taken perpendicular to the first direction has a curved surface shape.

With the configuration of the above-described (4), the contact portion does not have a sharp edge that comes into contact with the front surface of the hooked portion, and thus it is possible to avoid unnecessary damage to the front surface of the hooked portions and the formation of shavings and the like.

(5) In the connector described in the above-described (3) or (4), it is preferable that the housing includes a protrusion protruding rearward from a rear surface of the rear end portion, the outer conductor includes a recess configured to receive the protrusion, in a front surface of the front end portion, and the protrusion includes a guide surface inclined toward the hooked portion, at least at an edge portion facing the first direction of a leading end outer peripheral portion.

With the configuration of the above-described (5), when the outer conductor and the housing are attached to each other, the opening edge portion and the like of the recess can be moved in the first direction along the guide surface of the protrusion, and thus the hooking portion can be smoothly moved to a position where the hooking portion can be hooked to the hooked portion.

(6) In the connector described in the above-described (5), it is preferable that the leading end outer peripheral portion of the protrusion includes a chamfered portion at a portion adjacent to the guide surface, and a slope length of the guide surface is longer than a slope length of the chamfered portion.

With the configuration of the above-described (6), since the guide surface is not merely a chamfered portion, the slope length of the guide surface can be set sufficiently longer than the slope length of the chamfered portion.

Description of Embodiments of the Present Disclosure

Specific examples of the present disclosure will be described below with reference to the drawings. Note that the present invention is not limited to these illustrative examples but is indicated by the scope of the claims, and all modifications that fall within the meaning and range of equivalency to the scope of the claims are intended to be encompassed therein.

First Embodiment

As shown in FIG. 1, the connector 10 in a first embodiment includes inner conductors 11, an outer conductor 12, inductors 13, and a housing 14. The connector 10 further includes a closing member 15 and a tubular member 16. The housing 14 can be fitted to a partner connector (not shown). Note that, in the following description, with respect to a front-rear direction, the side on which the housing 14 is fitted to the partner connecter is the front side. The up-down direction is based on the up-down direction in FIG. 1. In FIG. 1, the direction indicated by the arrow X is frontward, the direction indicated by the arrow Y is leftward, and the direction indicated by the arrow Z is upward. The upward direction may also be referred to as a first direction, and the downward direction may also be referred to as a second direction. The references of these directions do not necessarily match the references of the directions in the case where the connector 10 is mounted in a vehicle or the like which is not shown.

[Inner Conductors 11 and Inductors 13]

Figure 2:
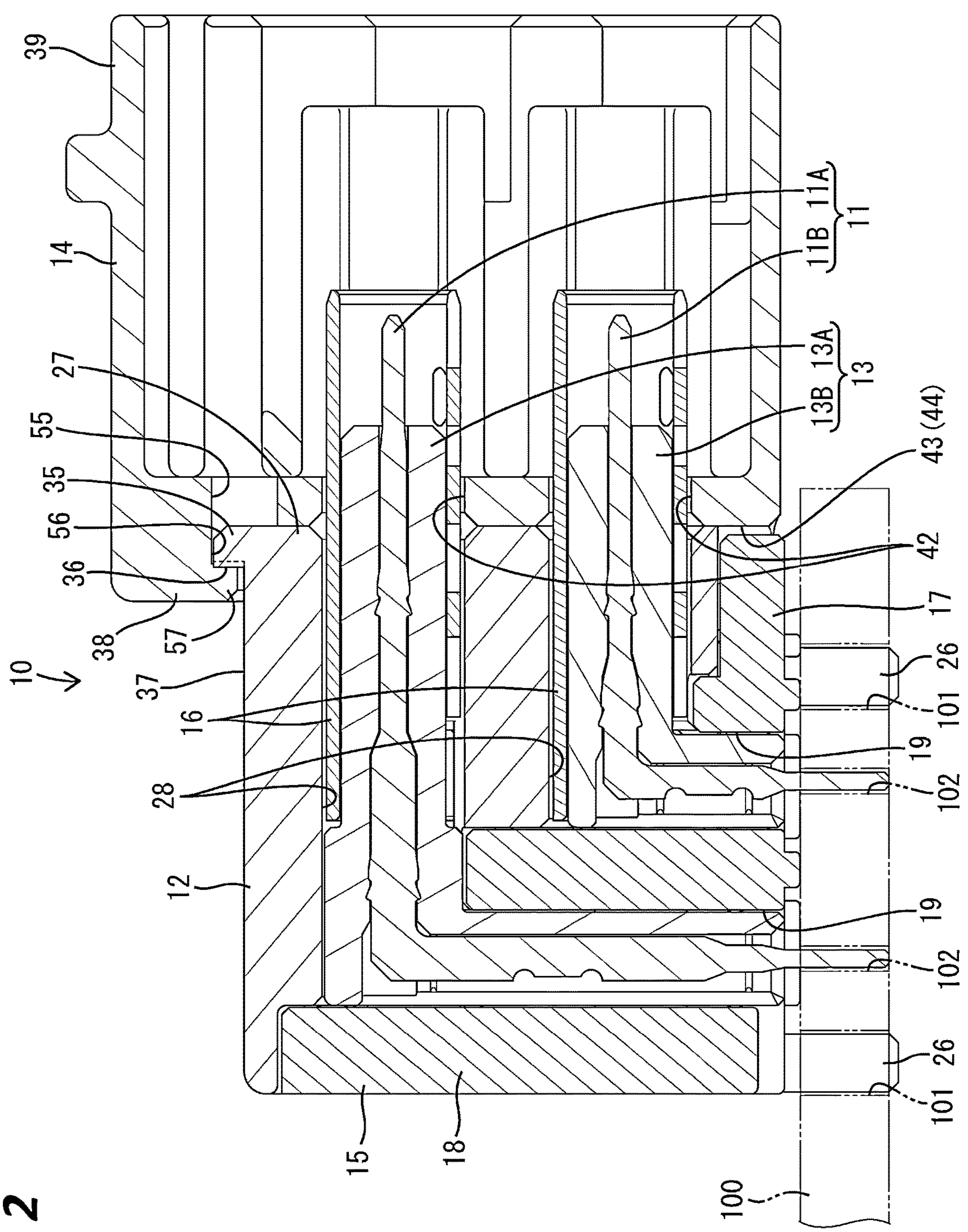
FIG. 2 is a lateral cross-sectional view obtained by cutting a portion of the connector according to the first embodiment which includes an inner conductor and an inductor.

The inner conductors 11 are each formed by an electrically conductive metal plate member, and have a shape of an L-shaped pin in side view, as shown in FIGS. 1 and 2. This connector 10 includes a pair of long inner conductors 11A and a pair of short inner conductors 11B.

The inductors 13 are each formed by an electrically insulating synthetic resin member, and have a shape of an L-shaped block in side view. The connector 10 includes a pair of long inductors 13A that correspond to the long inner conductors 11A, and a pair of short inductors 13B that correspond to the short inner conductors 11B. The inductors 13 each house the corresponding inner conductor 11. A front-end portion of each inner conductor 11 protrudes forward from the inductor 13, and is electrically connected to a partner inner conductor (not shown). As shown in FIG. 2, the lower end portions of the inner conductors 11 protrude downward from the inductors 13, and are inserted into through holes 102 of a circuit board 100 so as to be electrically connected to a conductive portion (not shown). A rear surface of a portion of each inner conductor 11 extending in the up-down direction is exposed rearward of each inductor 13 until the closing member 15 is disposed.

[Outer Conductor 12, Closing Member 15, and Tubular Members 16]

The outer conductor 12, the closing member 15, and the tubular members 16 are formed by electrically conductive metal members. Of these, the outer conductor 12 and the closing member 15 are die-cast parts, and formed as thick rigid bodies which are not elastically deformable. The tubular members 16 are pressed parts and formed as elastically deformable plate members.

As shown in FIG. 1, the tubular members 16 are cylindrical and disposed such that their axes extend in the front-rear direction. As shown in FIG. 2, portions of the inductors 13 that extend in the front-rear direction are inserted into the tubular members 16 and outer circumferences thereof are covered. Outer circumferences of front-end portions of the inner conductors 11 that protrude from the inductors 13 are surrounded by the tubular members 16.

Figure 4:
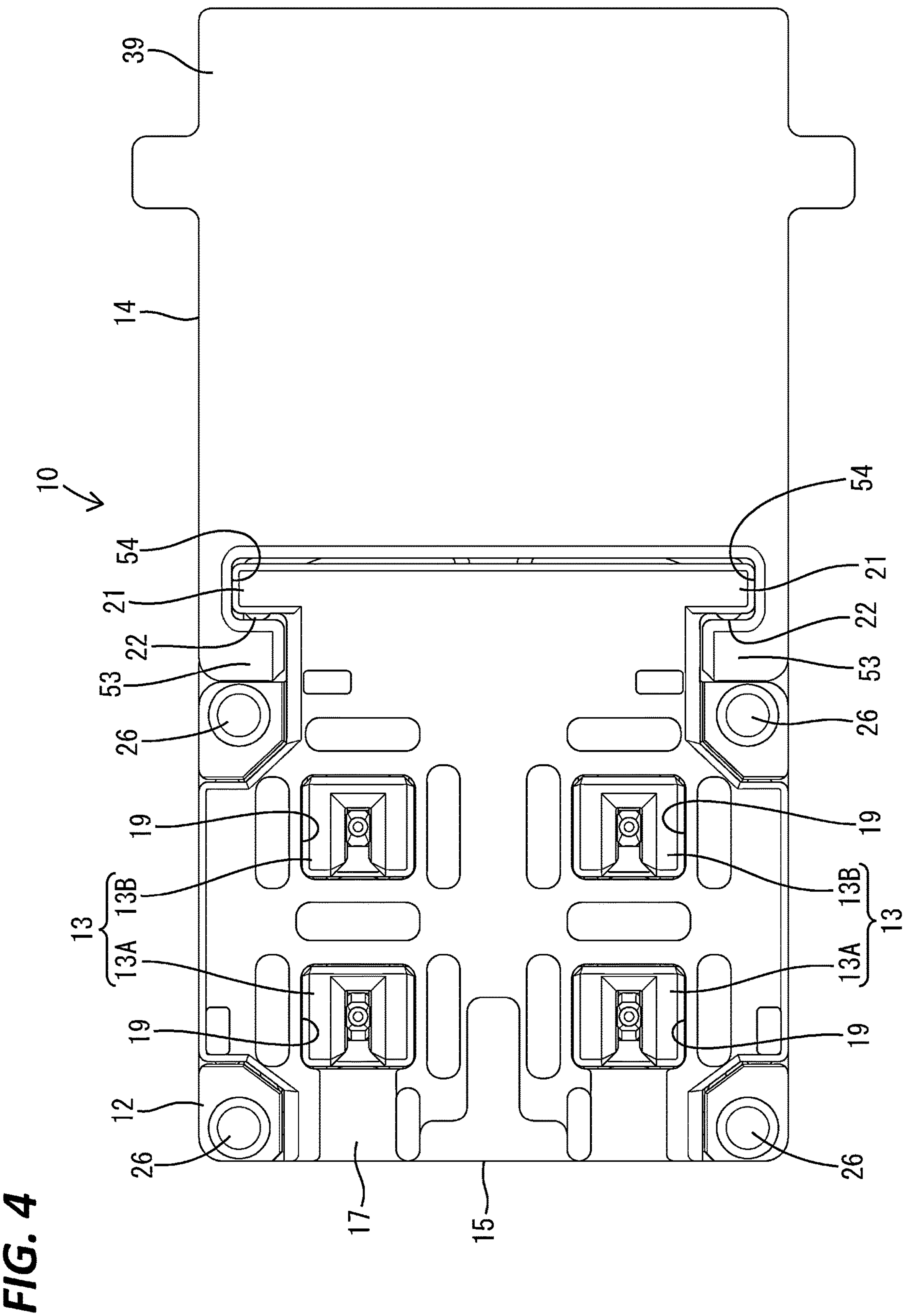
FIG. 4 is a bottom view of the connector according to the first embodiment.

The closing member 15 is attached to the outer conductor 12 and the housing 14 from below. As shown in FIG. 1, the closing member 15 includes a bottom wall portion 17 having a rectangular shape in bottom view, and a rear wall portion 18 having a rectangular shape in rear view and that rises up from a rear end of the bottom wall portion 17. As shown in FIG. 4, the bottom wall portion 17 includes four insertion holes 19 through which lower end portions of the inductors 13 extend. Further, a front-end portion of the bottom wall portion 17 includes a pair of press-fit portions 21 that respectively protrude leftward and rightward. The press-fit portions 21 have a prismatic column shape, and each include a press-fit rib 22 extending in the up-down direction in a center portion in the left-right direction of a rear surface thereof. The press-fit portions 21 are press-fitted to press-fit receiving portions 53 (described later) of the housing 14.

Figure 6:
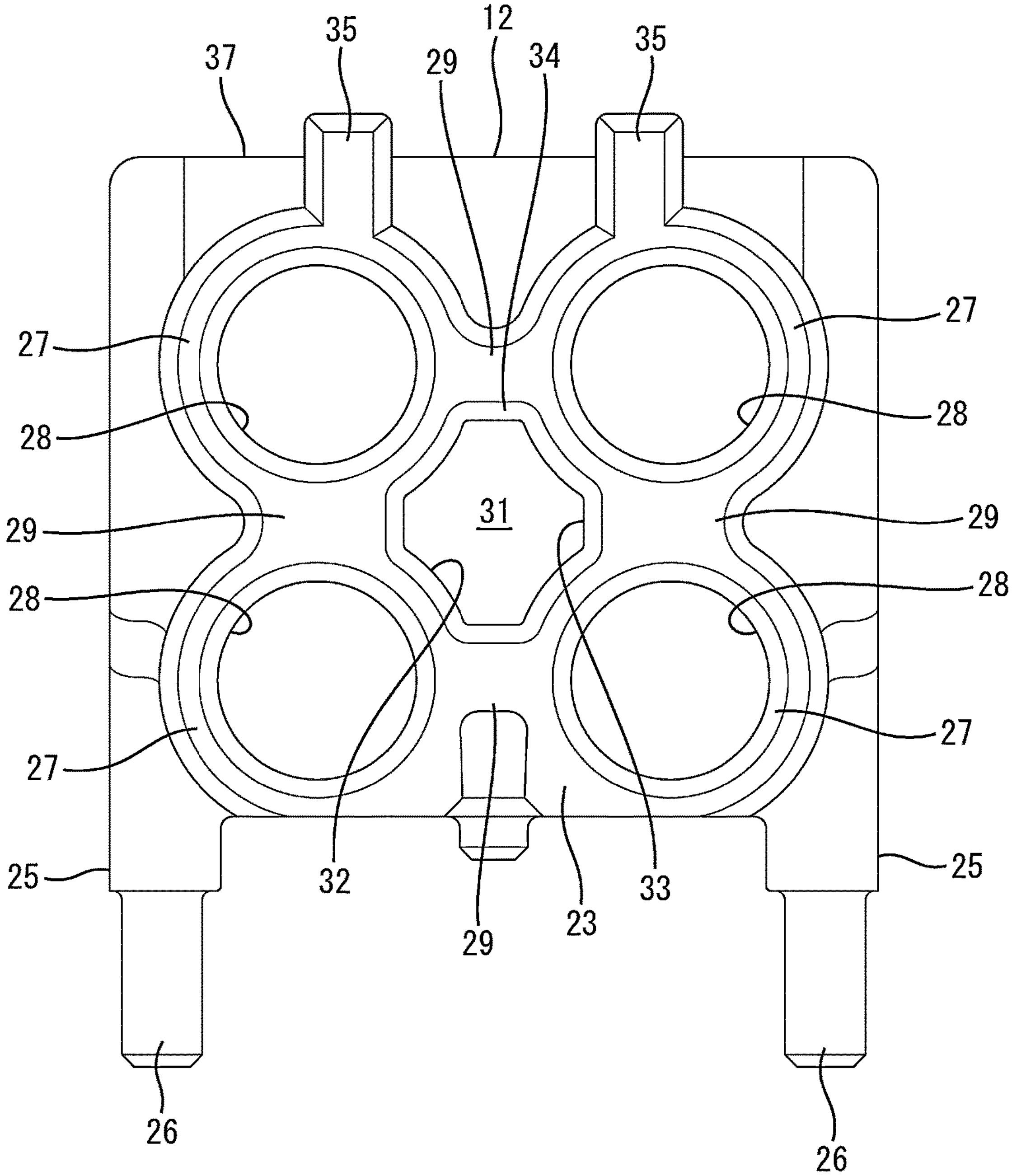
FIG. 6 is a front view of an outer conductor of the connector according to the first embodiment.
Figure 7:
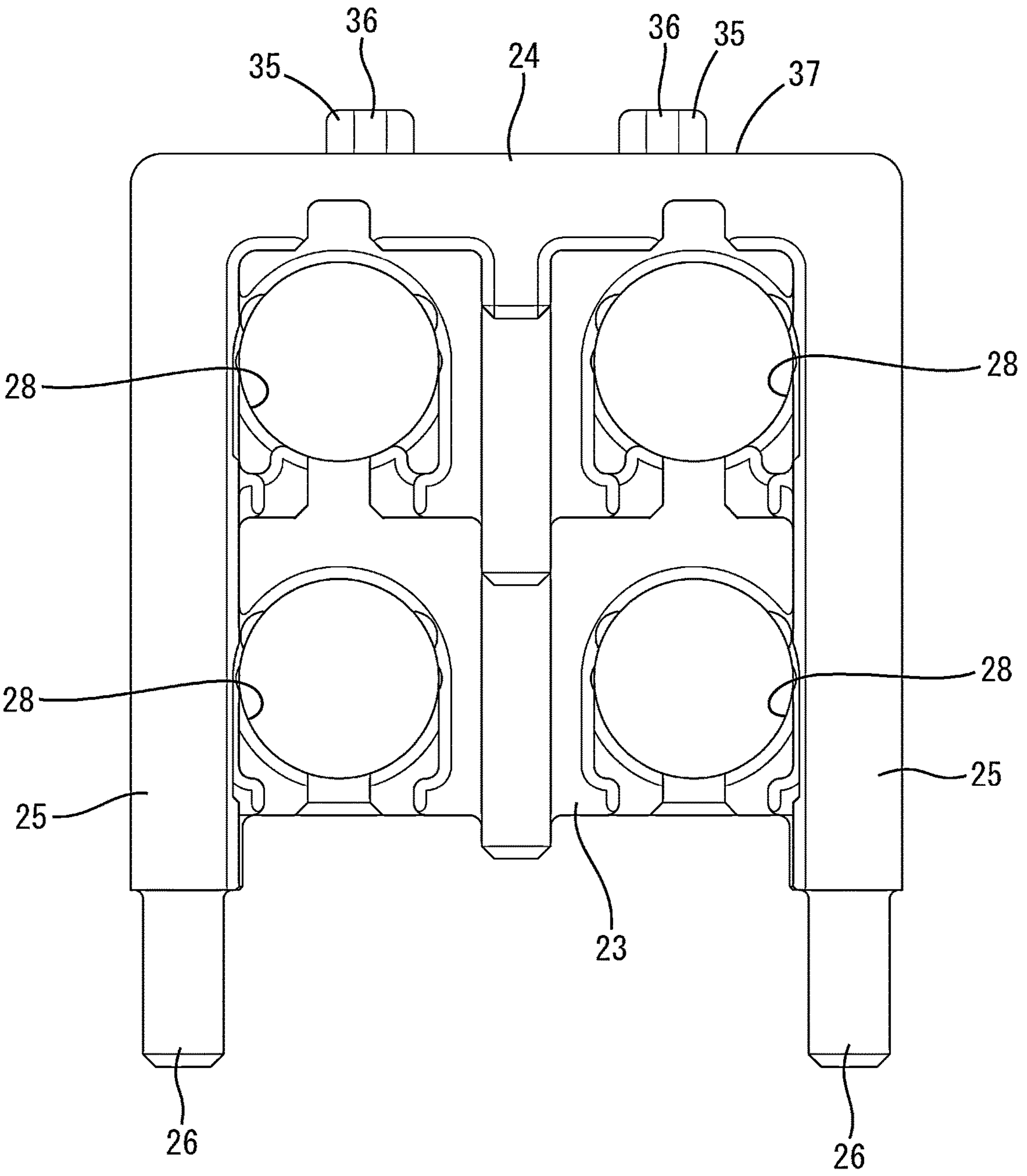
FIG. 7 is a rear view of the outer conductor of the connector according to the first embodiment.

As shown in FIGS. 1, 6, and 7, the outer conductor 12 has a rectangular box shape, includes a front wall portion 23, an upper wall portion 24, and a pair of left and right side wall portions 25, and is open rearward and downward. The side wall portions 25 each include a cylindrical leg portion 26 protruding downward from front-side and rear-side positions of the lower end. As shown in FIG. 2, by the leg portions 26 being inserted into the holes 101 of the circuit board 100 and soldered, the outer conductor 12 is positioned and fixed to the circuit board 100.

As shown in FIG. 2, portions of the inductors 13 and the inner conductors 11 other than the lower-end portions and the front-end portions thereof are disposed inside the outer conductor 12. When the closing member 15 is coupled to the outer conductor 12, the rear portions of the inductors 13 and the inner conductors 11 disposed inside the outer conductor 12 are closed by a rear wall portion 18 of the closing member 15. The lower end portions of the inductors 13 are fitted to the insertion holes 19 of the bottom wall portion 17 of the closing member 15.

As shown in FIG. 6, the outer conductor 12 includes a plurality of tubular portions 27 protruding forward from the front wall portion 23. The four tubular portions 27 are respectively disposed at an upper portion, a lower portion, a left portion, and a right portion of the front wall portion 23 in front view. The tubular portions 27 each include a through hole 28 that extends through a portion including the front wall portion 23 in the front-rear direction. As shown in FIG. 2, tubular members 16 are respectively inserted into and held in through holes 28 of the tubular portions 27.

As shown in FIG. 6, the pair of left and right tubular portions 27 and the pair of upper and lower tubular portions 27 are coupled to each other via coupling portions 29. The outer conductor 12 includes a recess 31 defined by the tubular portions 27 and the coupling portions 29 in the center portion in front view. The recess 31 is open frontward. A back surface of the recess 31 is formed by a front surface of the front wall portion 23. A peripheral surface of the recess 31 is formed by arc-shaped surfaces 32 of the outer circumferences of the tubular portions 27, and linear end surfaces 33 extending along a direction in which the coupling portions 29 couple the tubular portions 27 with each other. A chamfered inclined surface 34 that is widely open frontward is formed at the entire circumference of an opening edge portion of the peripheral surface of the recess 31.

As shown in FIGS. 1, 6, and 7, the outer conductor 12 includes a pair of hooking portions 35 that protrude upward (first direction) from upper surfaces of the two tubular portions 27 disposed on the upper level. As shown in FIG. 2, the hooking portions 35 can be hooked by and locked to hooked portions 57 (described later) of the housing 14.

The hooking portions 35 each have a rectangular plate shape (wall shape) in front view, in which a front surface is continuous and flush with a front surface of the tubular portion 27 (see FIG. 6), and a lower end portion of a rear surface is connected to a front surface of the front wall portion 23. In other words, the length of the hooking portions 35 is the same as the tubular portions 27 with respect to the front-rear direction. The hooking portions 35 each include a portion protruding in the first direction from an upper surface (hereinafter referred to as a first surface 37) of the upper wall portion 24. As shown in FIG. 7, the hooking portions 35 each include a rib-shaped contact portion 36 in the center portion in the left-right direction of the rear surface. Each contact portion 36 extends in the first direction along a rear surface of the contact portion 36 from the first surface 37 of the upper wall portion 24 to an upper end of the hooking portion 35. The cross-sectional shape (lateral cross-sectional shape) of the contact portions 36 is a shape of an arcuate curved surface (see FIG. 1).

[Housing 14]

Figure 8:
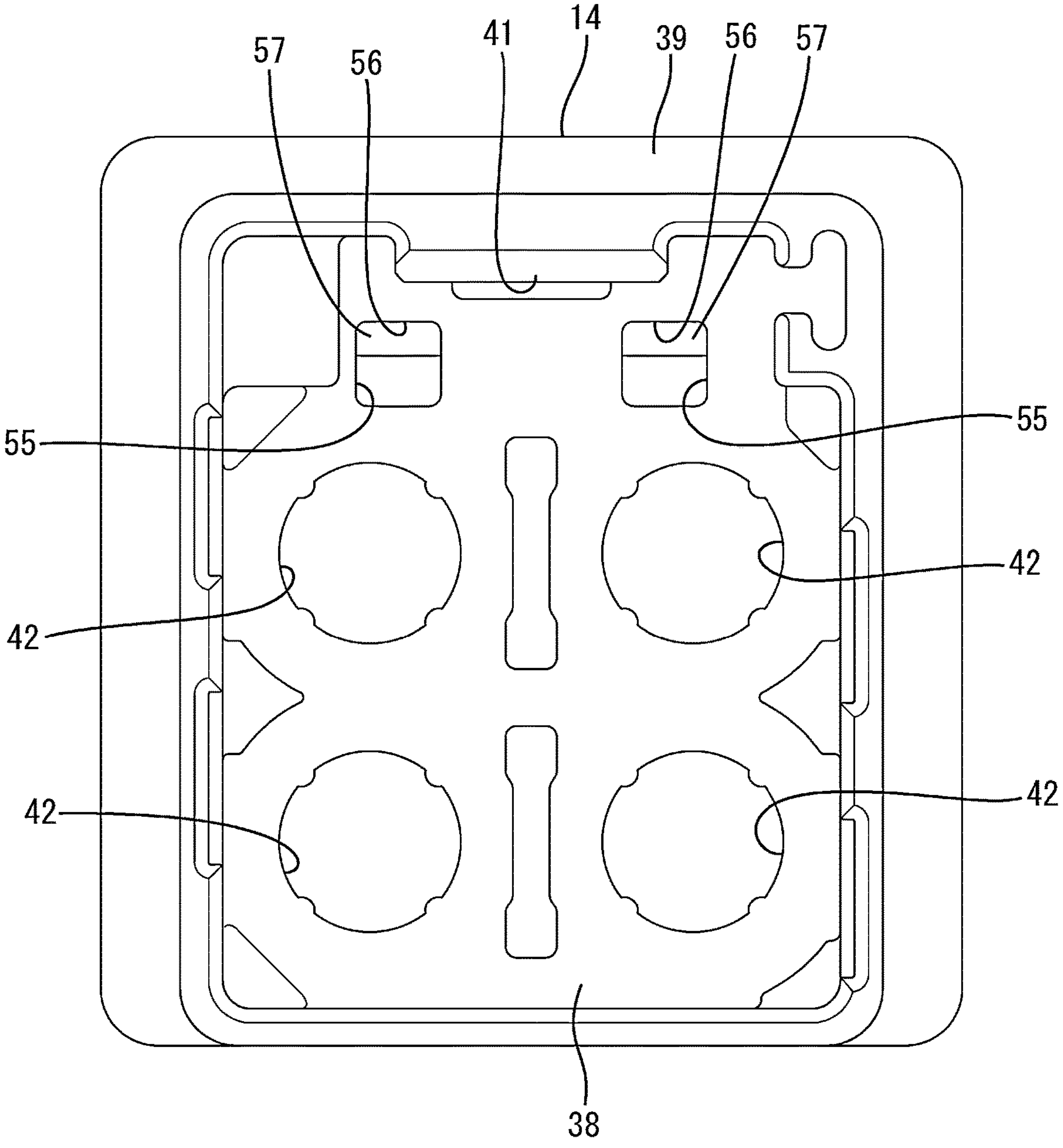
FIG. 8 is a front view of a housing of the connector according to the first embodiment.
Figure 9:
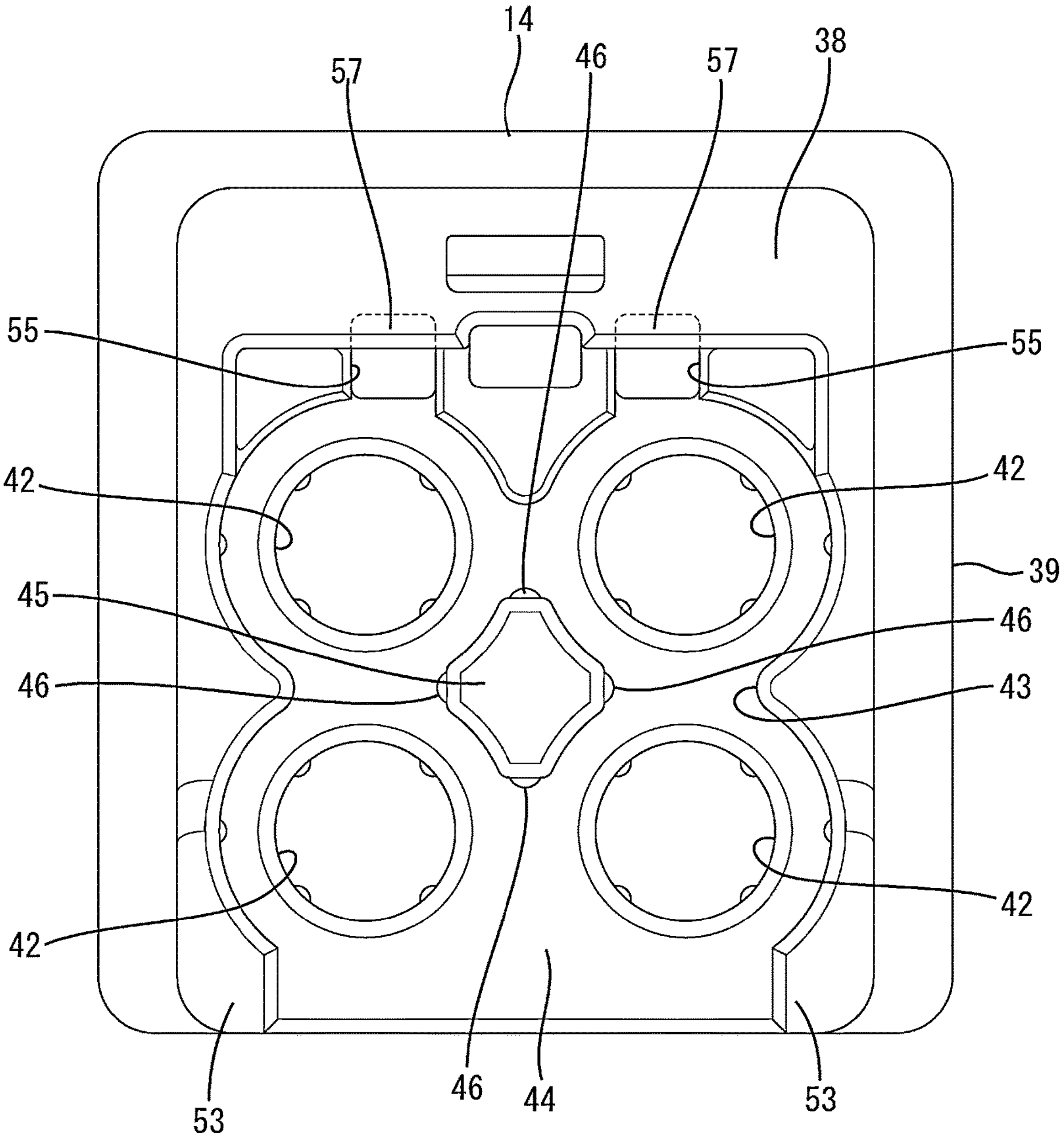
FIG. 9 is a rear view of the housing of the connector according to the first embodiment.
Figure 14:
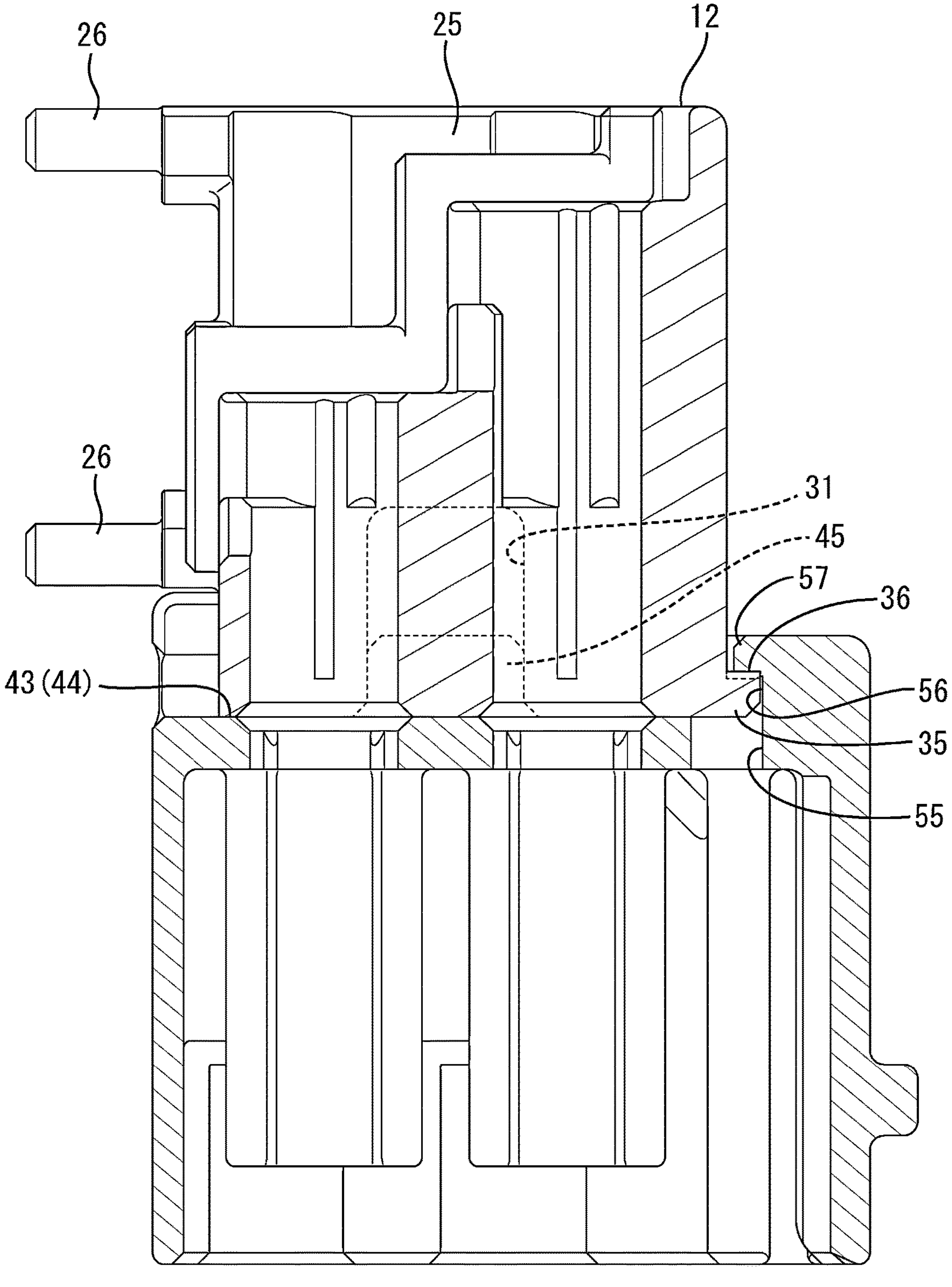
FIG. 14 is a lateral cross-sectional view showing a state where the outer conductor has been attached to the housing of the connector according to the first embodiment.

The housing 14 is made of a synthetic resin, and as shown in FIGS. 1, 8, and 9, has a tubular shape on the whole, and is open frontward. The housing 14 includes a base wall portion 38 having a rectangular shape in plan view, and an angular tube shaped peripheral wall portion 39 protruding forward from an outer edge of the base wall portion 38. As shown in FIG. 14, the outer conductor 12 is disposed side by side with the housing 14 rearward of the base wall portion 38.

Figure 3:
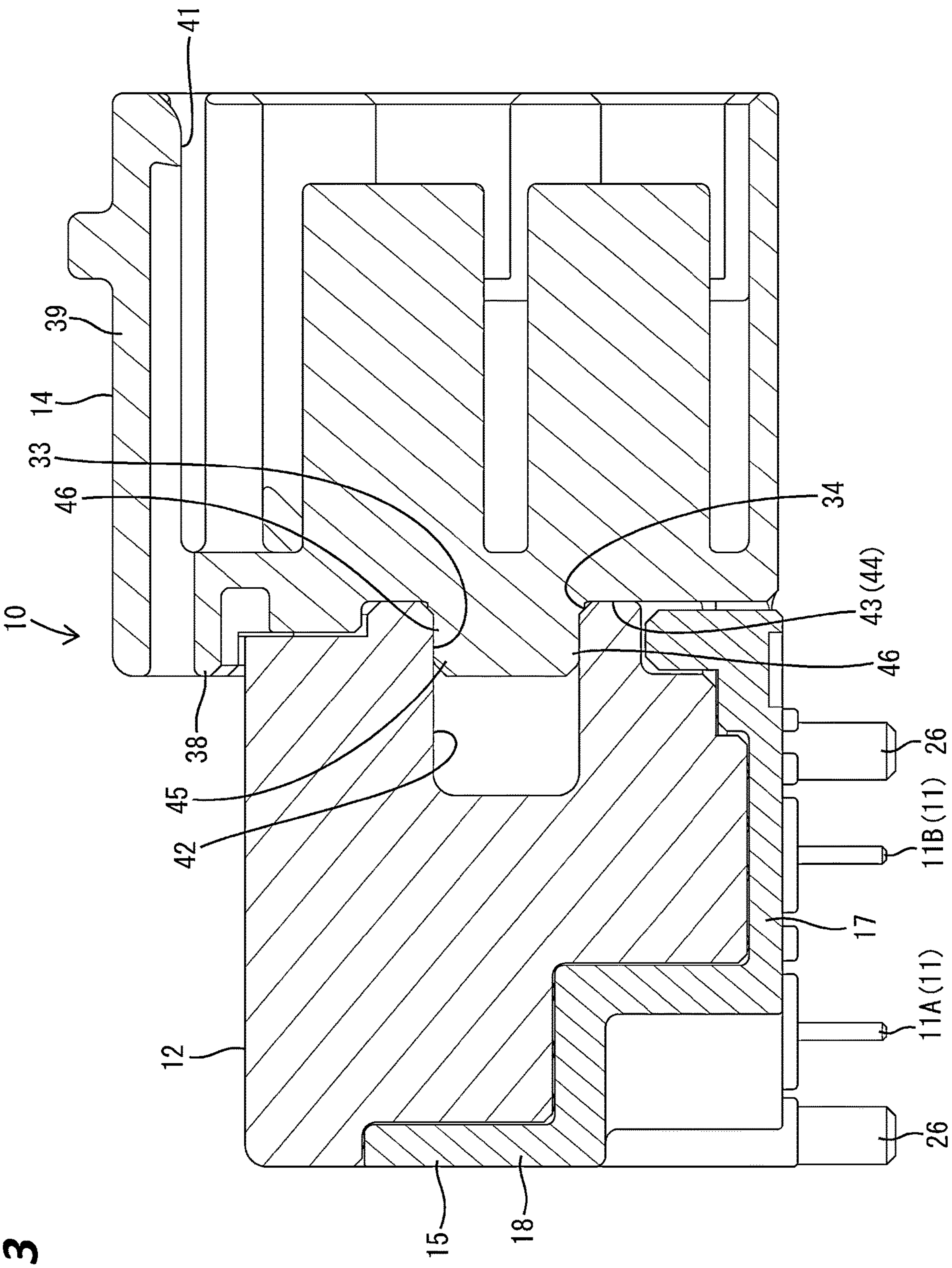
FIG. 3 is a lateral cross-sectional view obtained by cutting a portion of the connector according to the first embodiment which includes a protrusion and a recess.

As shown in FIGS. 3 and 8, the peripheral wall portion 39 has a claw-shaped lock portion 41 protruding inward of the housing 14 from a front-end portion of an inner surface of an upper wall portion. A partner connector (not shown) is fitted into the housing 14 from the front. By the lock portion 41 being locked to the partner connector, the connector 10 and the partner connector are fitted to each other and held.

Figure 5:
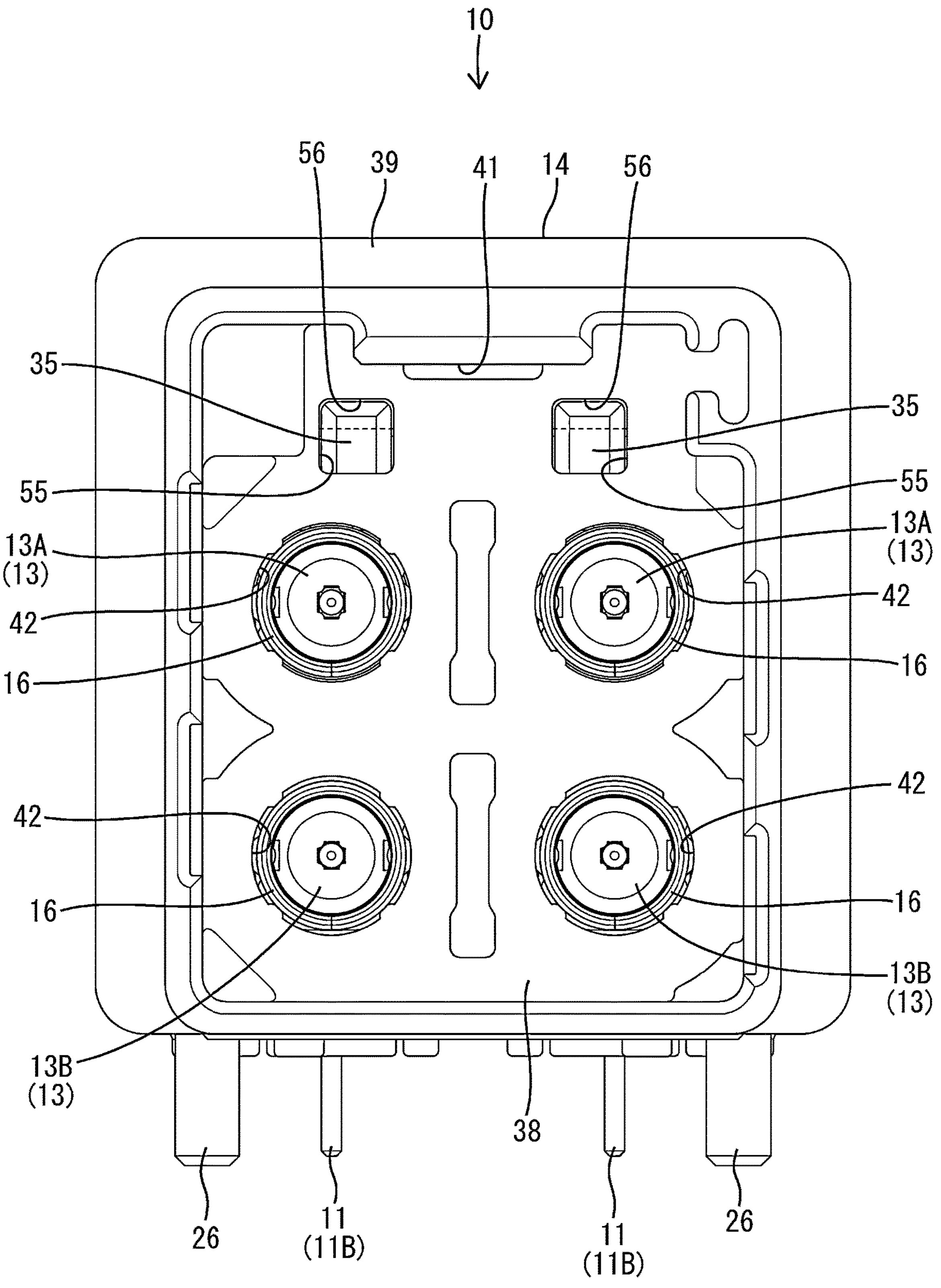
FIG. 5 is a front view of the connector according to the first embodiment.

As shown in FIG. 8, the housing 14 includes a plurality of insertion holes 42 that extend through the base wall portion 38 in the front-rear direction. The insertion holes 42 each have a circular cross-section, and the four insertion holes 42 are disposed at an upper portion, a lower portion, a left portion, and a right portion of the base wall portion 38, respectively. As shown in FIGS. 2 and 5, the tubular members 16 are respectively inserted into and held in the insertion holes 42 of the housing 14.

As shown in FIG. 9, the housing 14 includes an attachment recess 43 that is recessed in a rear surface of the base wall portion 38. As shown in FIGS. 2 and 3, the attachment recess 43 is formed in a rear-half portion that is within the range of the thickness of the base wall portion 38. The attachment recess 43 has a shape that can be fitted to the front-end portion of the outer conductor 12. Specifically, lower portions of the tubular portions 27, the coupling portion 29, and the hooking portions 35 shown in FIG. 6 can be fitted to the attachment recess 43.

In the present disclosure, a back surface 44 of the attachment recess 43 forms a rear surface of a rear end portion of the housing 14. The insertion holes 42 are open at an upper portion, a lower portion, a left portion, and a right portion of the back surface 44 of the attachment recess 43.

The housing 14 includes a protrusion 45 protruding rearward from a center portion of the back surface 44 (rear surface of the rear end portion) of the attachment recess 43. The protrusion 45 is disposed between the insertion holes 42 in rear view of the housing 14. As shown in FIG. 3, the protrusion 45 is inserted and fitted to the recess 31 of the outer conductor 12.

Figure 10:
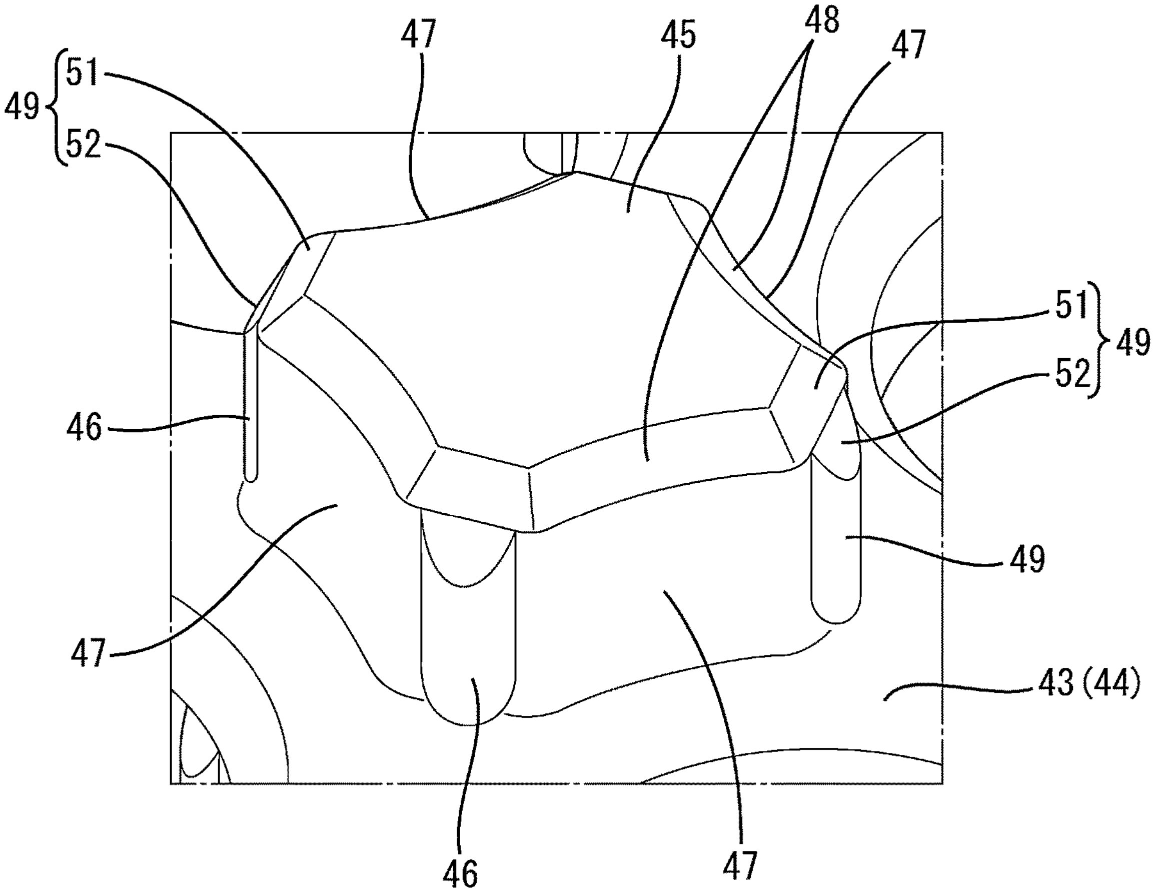
FIG. 10 is an enlarged perspective view of a protrusion of the connector according to the first embodiment.

Four ribs 46 respectively protrude from an upper position, a lower position, a left position, and a right position in the peripheral surface of the protrusion 45 at 90-degree intervals in the peripheral direction. As shown in FIG. 10, the ribs 46 extend over the entire length in the front-rear direction of the peripheral surface of the protrusion 45, and have an arc shaped cross section (lateral cross section). The ribs 46 are disposed at end surfaces 33 of the coupling portions 29 (recess 31) of the outer conductor 12 in contact with each other in the front-rear direction. Of the peripheral surfaces of the protrusion 45, four arc-shaped surfaces 47 formed between the ribs 46 oppose the arc-shaped surfaces 32 of the tubular portions 27 (recess 31).

As shown in FIG. 10, the protrusion 45 includes four chamfered portions 48 tapered and inclined toward a radial center at rear end outer peripheral portions (leading end outer peripheral portions) of the arc-shaped surfaces 47. Also, the protrusion 45 includes four guide surfaces 49 tapered and inclined toward the radial center, between the rear end outer peripheral portions including the ribs 46 (chamfered portions 48). The slope length (length in the inclining direction) of each guide surface 49 is longer than the slope length of each chamfered portion 48 by an amount corresponding to the protruding amount of the ribs 46. Each guide surface 49 includes an inner guide surface 51 that is continuous with the chamfered portion 48 in the peripheral direction, and an outer guide surface 52 that forms a rear end surface of the ribs 46 and is inclined, with respect to the radial direction, at an angle larger than that of the inner guide surface 51.

Figure 11:
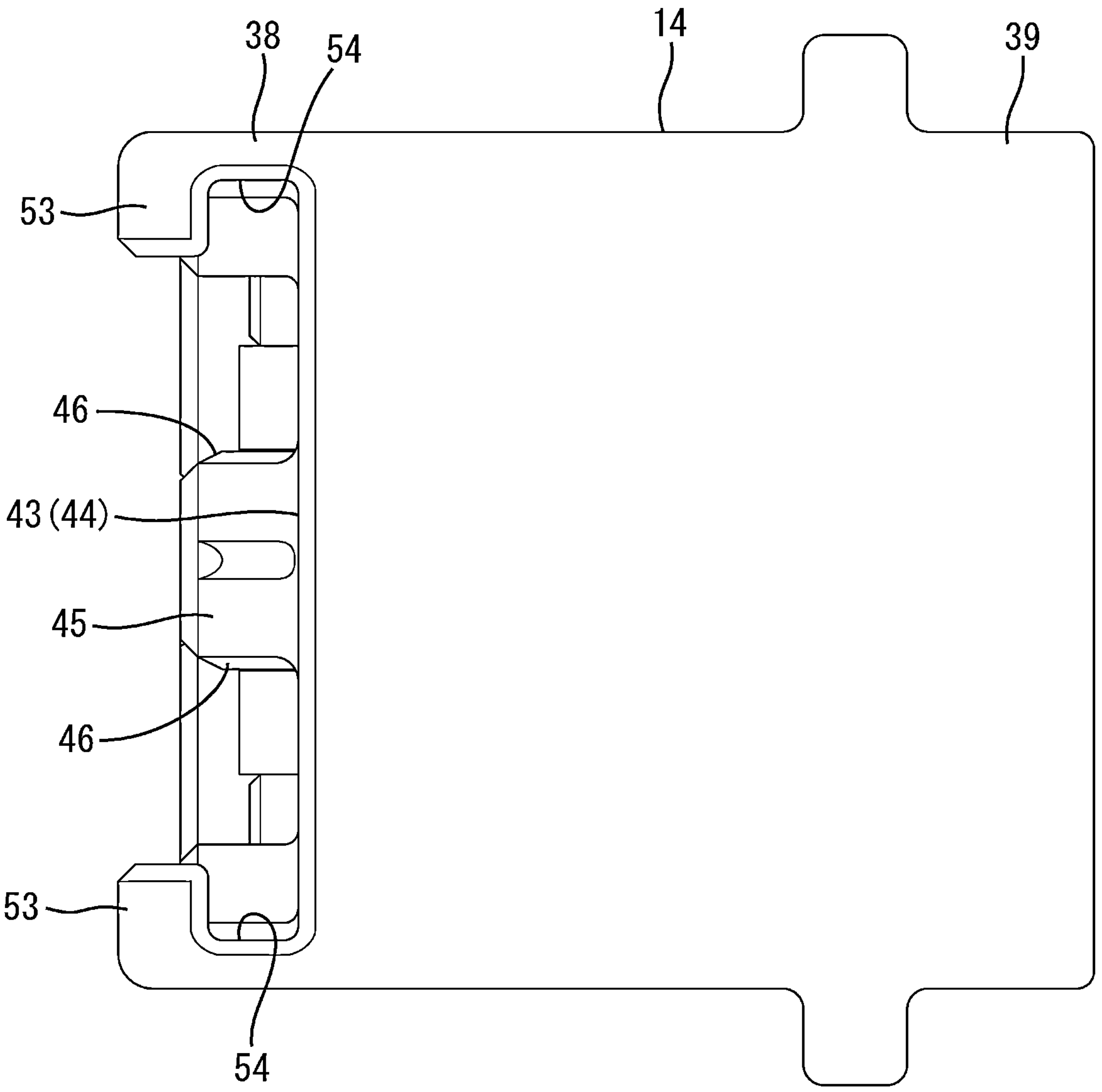
FIG. 11 is a bottom view of the housing of the connector according to the first embodiment.

As shown in FIGS. 9 and 11, the housing 14 includes a pair of press-fit receiving portions 53 at left and right end portions on the lower end side that define the attachment recess 43 of the base wall portion 38. As shown in FIG. 11, the press-fit receiving portions 53 each include a portion protruding rearward of the base wall portion 38, and a fitting recess 54 to which a corresponding press-fit portion 21 can be fitted at inner surfaces that oppose each other (see FIG. 4).

As shown in FIG. 9, the housing 14 includes a pair of punched holes 55 disposed at an interval in the left-right direction, on the upper end side of the attachment recess 43 of the base wall portion 38. The punched holes 55 each have a rectangular cross section and extend through the base wall portion 38 in the front-rear direction. As shown in FIG. 8, the housing 14 includes a pair of hooked portions 57 protruding downward (second direction) of an inner-upper surface (a surface facing downward and also referred to as a second surface 56) extending along the left-right direction with respect to the punched holes 55. A front surface of each hooked portion 57 is disposed so as to be exposed forward inside the punched hole 55. Front surfaces of the hooked portions 57 extend along the up-down direction and the left-right direction. As shown in FIG. 9, rear surfaces of the hooked portions 57 form a portion of an upper end edge portion extending along the left-right direction and defining the attachment recess 43 of the base wall portion 38.

[Operations of Connector 10]

Figure 12:
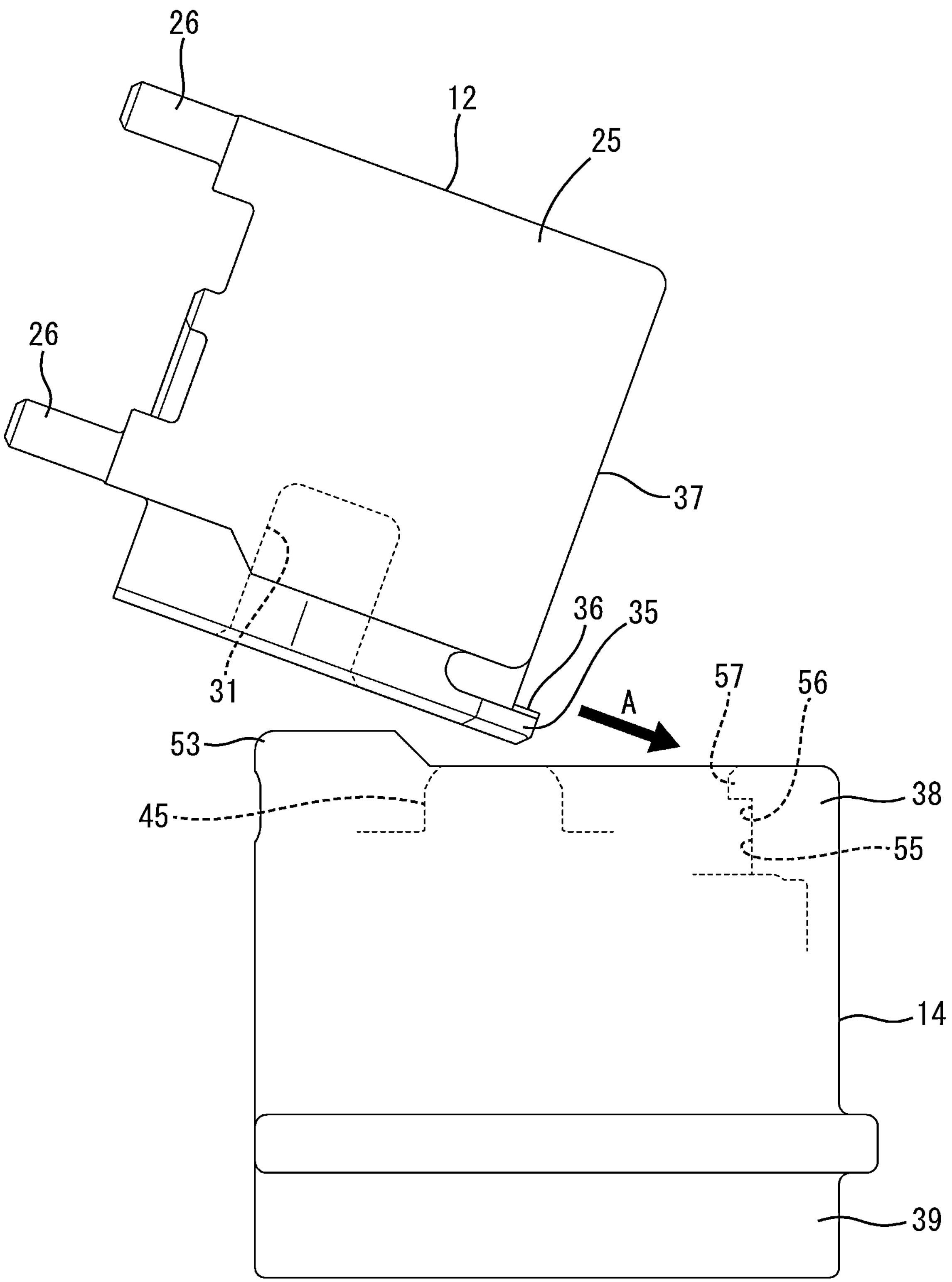
FIG. 12 is a side view showing a state immediately before attaching the outer conductor to the housing of the connector according to the first embodiment.
Figure 13:
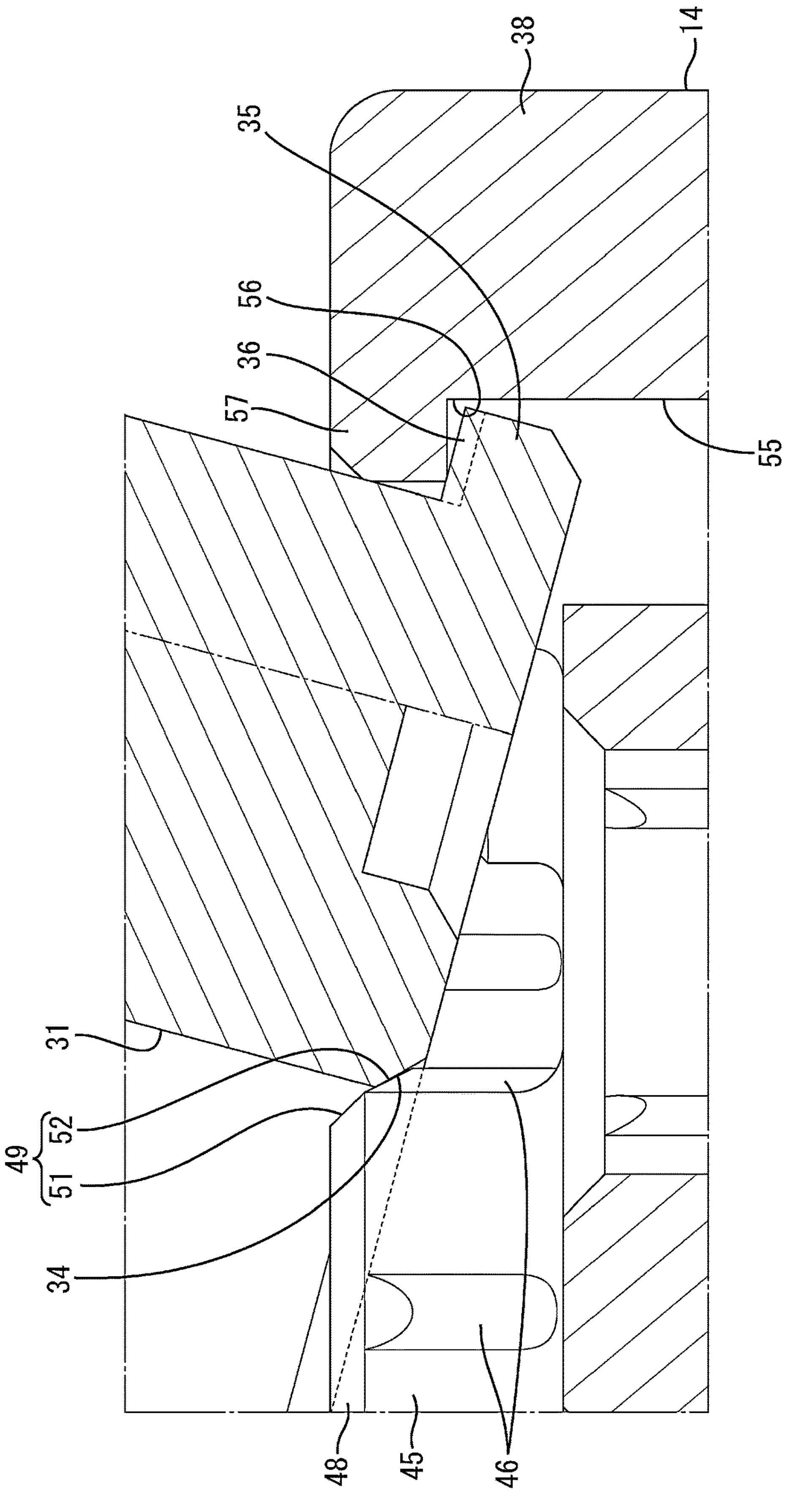
FIG. 13 is an enlarged lateral cross-sectional view showing a state where, in a process of attaching the outer conductor to the housing of the connector according to the first embodiment, an opening edge portion of a recess comes into contact with a guide surface of the protrusion and a hooking portion enters a punched hole.

First, a process for attaching the outer conductor 12 to the housing 14 will be described based on FIGS. 12 to 14. Note that FIGS. 12 to 14 represent modes in which the outer conductor 12 and the housing 14 are installed at an assembly site. In the drawings, the rear surface of the housing 14 faces upward, the upper surface of the housing 14 faces rightward, the front surface of the outer conductor 12 faces downward, and the upper surface of the outer conductor 12 faces rightward. In other words, FIGS. 12 to 14 represent a state where the connector 10 has been rotated by 90 degrees from the state shown in FIGS. 1 and 2.

As shown in FIG. 12, the outer conductor 12 is moved along an arrow A direction corresponding to the first direction with respect to the housing 14 while taking an inclined posture in which the upper end portion is tilted downward toward the front. When the outer conductor 12 moves along the arrow A direction, as shown in FIG. 13, the inclined surfaces 34 of the recess 31 of the outer conductor 12 slide along the guide surfaces 49 of the protrusion 45 of the housing 14 (slide from the inner guide surfaces 51 to the outer guide surfaces 52), and the attachment operation of the outer conductor 12 to the housing 14 is guided. Each hooking portion 35 opposes a second surface 56 of the punched hole 55 as viewed in the arrow A direction. For this reason, due to movement of the outer conductor 12 in the arrow A direction, the hooking portions 35 respectively enter the punched holes 55.

In the state where the inclined surface 34 of the recess 31 comes into contact with the guide surface 49 of the protrusion 45 and the hooking portions 35 enter the punched holes 55, contact portions 36 of the hooking portions 35 are disposed so as to be capable of respectively coming into contact with the front surfaces of the hooked portions 57 along the up-down direction. Immediately before the attachment of the outer conductor 12 to the housing 14 is completed, the inclined surfaces 34 of the recess 31 are separated from the outer guide surfaces 52 of the guide surfaces 49 of the protrusion 45, and as shown in FIG. 14, the outer conductor 12 is displaced from the inclined posture to a horizontal posture (a posture along the left-right direction in FIG. 14) with respect to the housing 14. Then, while the hooked portions 57 are elastically deformed, the contact portions 36 of the hooking portions 35 are held in close (rigid) contact with front surfaces of the hooked portions 57. In this manner, the hooking portions 35 are hooked by and locked to the hooked portions 57. Also, when the outer conductor 12 takes a horizontal posture with respect to the housing 14, the front-end portion of the outer conductor 12 is fitted to the attachment recess 43, the protrusion 45 is also fitted to the recess 31 (see FIG. 3), and the ribs 46 of the protrusion 45 are held in close contact with the end surfaces 33 of the coupling portions 29 (recess 31).

In this manner, the outer conductor 12 and the housing 14 are held such that separation in the front-rear direction is restricted.

Next, the tubular members 16 are passed through the through holes 28 and the insertion holes 42 to be held by the outer conductor 12 and the housing 14 (see FIG. 2). At this time, it is preferable that the inductors 13 that respectively house the inner conductors 11 are inserted into the tubular members 16.

Next, the closing member 15 is attached to the outer conductor 12 and the housing 14 from below (see FIG. 4). The closing member 15 is press-fitted and held in the outer conductor 12, and press-fitted and held in the housing 14 as described later. In this manner, the closing member 15 is integrally held by the outer conductor 12 and the housing 14. The inner conductors 11 are surrounded by the outer conductor 12 and the closing member 15 via the inductors 13, and thus shielding performance is ensured.

As shown in FIG. 4, the press-fit portions 21 of the closing member 15 are fitted to the fitting recesses 54 of the press-fit receiving portions 53 of the housing 14. The press-fit ribs 22 of the press-fit portions 21 come in close contact with inner surfaces of the fitting recesses 54 along the up-down direction. In this manner, the front-end portion of the closing member 15 is fixed to the lower end portions on left and right sides of the rear end portion of the housing 14. Further, as described above, the front-end portion of the outer conductor 12 is fixed to the upper end portions on the left and right sides of the rear end portion of the housing 14. For this reason, the outer conductor 12 and the closing member 15 are stably held by the housing 14.

As described above, according to the first embodiment, the outer conductor 12 includes the hooking portions 35 at the front end portion, the housing 14 includes the hooked portions 57 at the rear end portion, the rear surfaces of the hooking portions 35 oppose the front surfaces of the hooked portions 57, and the rib-shaped contact portions 36 that can come into contact with the front surfaces of the hooked portions 57 are formed on the rear surfaces of the hooking portions 35. Therefore, since the rear surfaces of the hooking portions 35 oppose the front surfaces of the hooked portions 57 and the rib-shaped contact portions 36 come into contact with the front surfaces of the hooked portions 57, the outer conductor 12 and the housing 14 can be attached to each other while avoiding the formation of a gap between the rear surfaces of the hooking portions 35 and the front surfaces of the hooked portions 57. As a result, it is possible to provide the connector 10 according to which the outer conductor 12 and the housing 14 can be easily attached to each other.

Since the outer conductor 12 is a metal rigid body (die-cast part) and the housing 14 is a molded body made of a synthetic resin, when the metal contact portions 36 come into contact with the front surfaces of the synthetic resin hooked portions 57, the hooked portions 57 can be elastically deformed, or the contact portions 36 can bite into the front surfaces of the hooked portions 57. Accordingly, the amount by which the contact portions 36 protrude from the rear surfaces of the hooking portions 35 can be adjusted, and the outer conductor 12 and the housing 14 can be attached to each other with an appropriate holding force.

Further, in the first embodiment, the outer conductor 12 includes the first surface 37 facing the first direction (upward) that intersects the front-rear direction, and the housing 14 includes the second surface 56 facing the second direction (downward) that is opposite to the first direction. The hooking portions 35 protrude from the first surface 37 in the first direction, the hooked portions 57 protrude from the second surface 56 in the second direction, and the contact portions 36 extend in the first direction from the first surface 37 at the rear surfaces of the hooking portions 35. Accordingly, when the outer conductor 12 is moved in the first direction to be attached to the housing 14, contact resistance between the outer conductor 12 and the housing 14 can be prevented from being excessively large.

Further, since cross-sections of the contact portions 36 taken perpendicular to the up-down direction have a curved surface shape, the contact portions 36 do not have sharp edges that come into contact with the front surfaces of the hooked portions 57, and thus it is possible to avoid unnecessary damage to the front surfaces of the hooked portions 57 and the formation of shavings and the like.

Further, the housing 14 includes a protrusion 45 protruding rearward from a back surface 44 (rear surface at the rear end portion of the housing 14) of the attachment recess 43, the outer conductor 12 includes the recess 31 that receives the protrusion 45 at the front surface of the front-end portion, and the protrusion 45 includes the guide surfaces 49 inclined toward the hooked portions 57 at edge portions facing the first direction of the leading end outer peripheral portions. For this reason, when the outer conductor 12 and the housing 14 are attached to each other, the inclined surfaces 34 of the recess 31 can be moved in the first direction along the guide surfaces 49 of the protrusion 45, and the hooking portions 35 can be smoothly moved to positions where the hooking portions 35 can be hooked to the hooked portions 57.

Further, in the first embodiment, the leading end outer peripheral portion of the protrusion 45 includes the chamfered portions 48 at portions adjacent to the guide surfaces 49, and the slope length of the guide surfaces 49 is longer than the slope length of the chamfered portions 48. In other words, since the guide surfaces 49 are not merely chamfered portions, the slope length of the guide surfaces 49 can be sufficiently set longer than the slope length of the chamfered portions 48.

OTHER EMBODIMENTS OF THE PRESENT DISCLOSURE

The first embodiment disclosed herein is exemplary in all respects, and should be construed as being not limitative.

In the first embodiment, the contact portions 36 are formed on the rear surfaces of the hooking portions 35. Alternatively, in another embodiment, the contact portions may be formed on the front surfaces of the hooked portions.

In the first embodiment, the outer conductor 12, the closing member 15, and the tubular members 16 are configured to be separable from each other. Alternatively, in another embodiment, the outer conductor and the tubular members may be integrally formed so as to be nondetachable, and the outer conductor and the closing member may also be integrally formed so as to be nondetachable. For example, when the outer conductor and the tubular members are integrally formed so as to be nondetachable, it is preferable that a configuration such as a cutout for avoiding interference with the housing and the tubular member is provided to the housing.

In the first embodiment, the two hooking portions 35 are provided on the outer conductor 12, and the two hooked portions 57 are provided on the housing 14. Alternatively, in another embodiment, the one or three or more hooking portions may also be provided on the outer conductor, and the one or three or more hooked portion may also be provided on the housing.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

an electrically conductive inner conductor;

an electrically conductive outer conductor surrounding the inner conductor via an electrically insulating inductor between the inner conductor and the outer conductor; and an electrically insulating housing configured to be coupled to the outer conductor, wherein the outer conductor includes a hooking portion at a front end portion thereof, the housing includes a hooked portion at a rear end portion thereof, a rear surface of the hooking portion opposes a front surface of the hooked portion, and a first surface out of the rear surface of the hooking portion and the front surface of the hooked portion includes a rib-shaped contact portion configured to come into contact with a second surface out of the rear surface of the hooking portion and the front surface of the hooked portion.

2. The connector according to claim 1, wherein the first surface is the rear surface of the hooking portion, and the second surface is the front surface of the hooked portion.

3. The connector according to claim 2, wherein the outer conductor includes a first surface facing a first direction intersecting a front-rear direction, the housing includes a second surface facing a second direction that is opposite to the first direction, the hooking portion protrudes in the first direction beyond the first surface, the hooked portion protrudes in the second direction beyond the second surface, and the contact portion extends in the first direction beyond the first surface in the rear surface of the hooking portion.

4. The connector according to claim 3, wherein a cross-section of the contact portion taken perpendicular to the first direction has a curved surface shape.

5. The connector according to claim 3, wherein the housing includes a protrusion protruding rearward from a rear surface of the rear end portion, the outer conductor includes a recess configured to receive the protrusion, in a front surface of the front end portion, and the protrusion includes a guide surface inclined toward the hooked portion, at least at an edge portion facing the first direction of a leading end outer peripheral portion.

6. The connector according to claim 5, wherein the leading end outer peripheral portion of the protrusion includes a chamfered portion at a portion adjacent to the guide surface, and a slope length of the guide surface is longer than a slope length of the chamfered portion.

* * * * *